(12) United States Patent
Palmaz et al.

(10) Patent No.: US 11,094,476 B2
(45) Date of Patent: *Aug. 17, 2021

(54) STRUCTURAL SUPER-CAPACITOR COMPOSITE AND METHOD OF MAKING SAME

(71) Applicant: Vactronix Scientific, LLC, Fremont, CA (US)

(72) Inventors: Christian Gaston Palmaz, Fremont, CA (US); Julio C. Palmaz, Napa, CA (US)

(73) Assignee: Vactronix Scientific LLC, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/524,479

(22) Filed: Jul. 29, 2019

(65) Prior Publication Data

US 2019/0355528 A1 Nov. 21, 2019

Related U.S. Application Data

(63) Continuation of application No. 15/819,217, filed on Nov. 21, 2017, now Pat. No. 10,373,767.

(51) Int. Cl.
*H01G 11/10* (2013.01)
*H01G 11/84* (2013.01)
*H01G 11/08* (2013.01)

(52) U.S. Cl.
CPC .............. *H01G 11/84* (2013.01); *H01G 11/08* (2013.01); *H01G 11/10* (2013.01)

(58) Field of Classification Search
CPC ........ H01G 11/84; H01G 11/08; H01G 11/10; H01G 4/30; H01G 4/32; H01G 4/33; H01G 4/38
See application file for complete search history.

(56) References Cited

U.S. PATENT DOCUMENTS

| | | | |
|---|---|---|---|
| 6,379,383 B1 | 4/2002 | Palmaz et al. | 623/1.49 |
| 7,231,260 B2 | 6/2007 | Wallace et al. | 607/116 |
| 7,235,098 B2 | 6/2007 | Palmaz | 623/1.15 |
| 7,670,690 B2 | 3/2010 | Marton et al. | 428/544 |
| 8,372,139 B2 | 2/2013 | Bailey et al. | 623/1.19 |
| 9,050,394 B2 | 6/2015 | Carpenter et al. | A61L 31/022 |
| 9,220,899 B2 | 12/2015 | Cattanaco et al. | A61N 1/36114 |
| 9,272,077 B2 | 3/2016 | Palmaz | A61L 31/16 |
| 10,373,767 B2 * | 8/2019 | Palmaz | H01G 11/08 |
| 2010/0188799 A1 * | 7/2010 | Galvagni | H01G 4/012 361/306.3 |
| 2010/0206624 A1 * | 8/2010 | Feichtinger | H01G 4/228 174/260 |
| 2014/0042022 A1 | 2/2014 | Xu et al. | H01J 23/02 |
| 2014/0293504 A1 * | 10/2014 | Stuart | H01G 4/30 361/301.4 |
| 2017/0359893 A1 * | 12/2017 | Goh | H05K 1/0231 |

FOREIGN PATENT DOCUMENTS

WO WO2017/070252 4/2017

* cited by examiner

*Primary Examiner* — Dion Ferguson
(74) *Attorney, Agent, or Firm* — David G. Rosenbaum; Rosenbaum IP, P.C.

(57) ABSTRACT

Multi-layer modular capacitors adapted to be electrically coupled to each other and formed into a structural piece that is electrically coupled to an electrical device requiring a power supply.

14 Claims, 3 Drawing Sheets

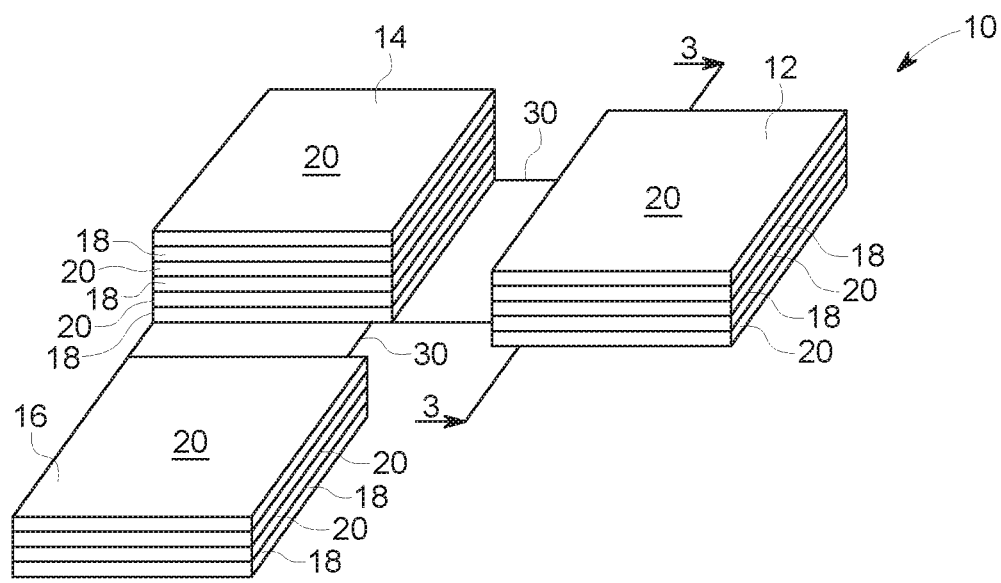
FIG. 1
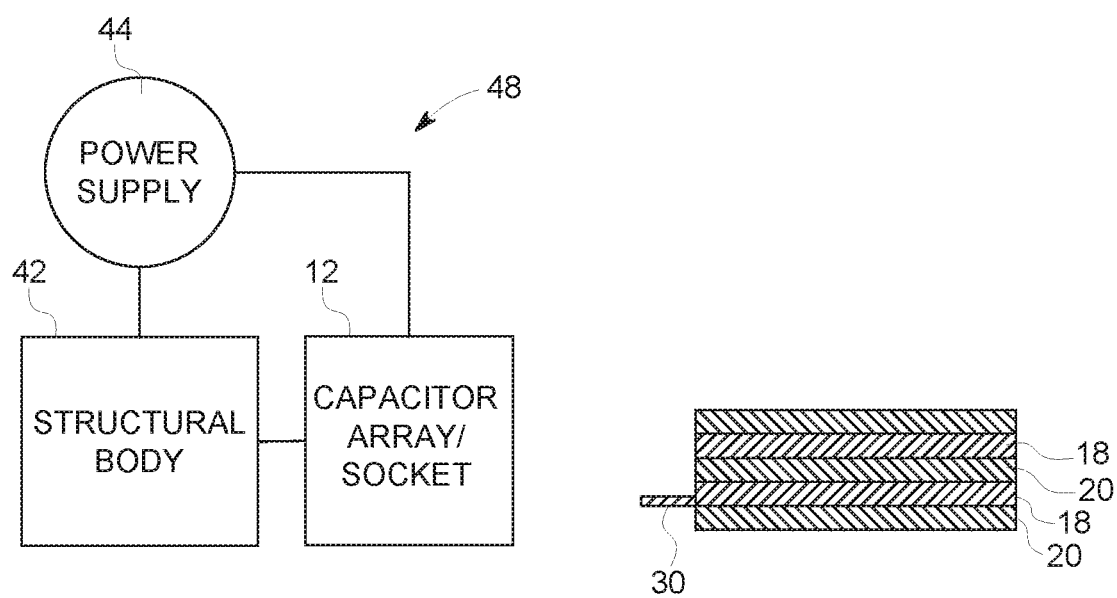
FIG. 2
FIG. 3

STRUCTURAL SUPER-CAPACITOR COMPOSITE AND METHOD OF MAKING SAME

CROSS-REFERENCE TO RELATED APPLICATIONS

This is a continuation of U.S. patent application Ser. No. 15/819,217, filed Nov. 21, 2017, now U.S. Pat. No. 10,373,767, which is hereby incorporated by reference in its entirety.

SUMMARY OF THE INVENTION

The present invention is related generally to capacitors and more particularly to multi-layer modular capacitors adapted to be electrically coupled to each other and formed into a structural piece that is electrically coupled to an electrical device requiring a power supply. As used herein, the term supercapacitor is intended to mean a high-capacity capacitor having capacitance values much higher than other capacitators and typically store at least 10 times more energy per unit volume or mass than electrolytic or other capacitors and accept and deliver charge significantly faster than batteries with significantly higher charge-discharge cycle capacity than rechargeable batteries. Supercapacitors are used in applications requiring many rapid charge/discharge cycles rather than long term compact energy storage: within cars, buses, trains, cranes and elevators, where they are used for regenerative braking, short-term energy storage or burst-mode power delivery.

The modular supercapacitor of the present invention consists generally of very small unit volume and unit mass. The inventive supercapacitors are made by vacuum deposition successive layers of conductive and dielectric layers of materials onto either a planar or shaped deposition substrate. Examples of suitable vacuum deposition methods are found in U.S. Pat. Nos. 6,379,383 and 7,670,690, which are hereby incorporated by reference in their entirety.

By employing vacuum deposition methods, the successive alternating conductive and dielectric layers may each have a thickness in the nanometer range, preferably greater than about 10 nm to about 15 microns. The resulting supercapacitor structure will preferably have several hundred or several thousand layers per 1 millimeter thickness of the supercapacitor structure.

The alternating successive layers of conductive and dielectric materials are formed into a composite structure that is very thin having a thickness of as little as about one micron up to about 10 millimeters or more. The conductive layers are electrically coupled to each other and are highly impervious electrical current leakage.

The inventive supercapacitors of the invention may be formed in sheets having large electrical capacitance and high mechanical properties capable of being formed into structural materials. Alternatively, the inventive supercapacitors of the invention may be formed into smaller units or tiles capable of being electrically coupled to each other by an electrical connection at an edge of each smaller unit or tile thereby permitting assembly of plural units or tiles into arrays of supercapacitors which are, in turn, electrically coupled to electrical or electromechanical couplers.

Where sheets of the inventive supercapacitor are formed, these sheets may, in turn, be formed into structural shapes and adapted for use as aircraft fuselages, automobile bodies, liners, or any other type of structural shape adapted to be electrically coupled to a primary energy source.

Where the inventive supercapacitor is made as smaller units or tiles and assembled into arrays of the tiles, these arrays may, in turn, be formed into or onto a substrate structure. Because of their small size, the tile arrays may be joined to a supporting substrate structure, such as by molding, embedding, potting, or adhesively coupling the tile array to the supporting substrate structure. Alternatively, the tile array may be formed in to self-supporting structure itself.

BRIEF DESCRIPTION OF THE FIGURES

FIG. 1 is a diagrammatic view of an array of inventive supercapacitor tiles in accordance with the present invention.

FIG. 2 is a block diagram illustrating the inventive supercapacitor array or sheet associated with a substrate structure and a primary energy source.

FIG. 3 is a cross-sectional view taken along line 3-3 of FIG. 1.

DETAILED DESCRIPTION OF THE PREFERRED EMBODIMENTS

Figure 4A:
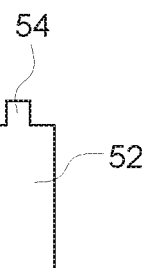
FIGS. 4A-4E depict assembly of successive conductive and dielectric layers of the inventive supercapacitor.
Figure 4B:
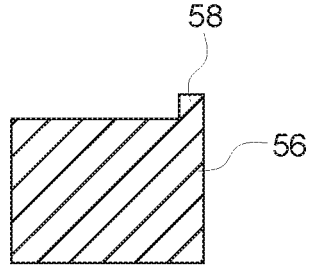
Figure 4C:
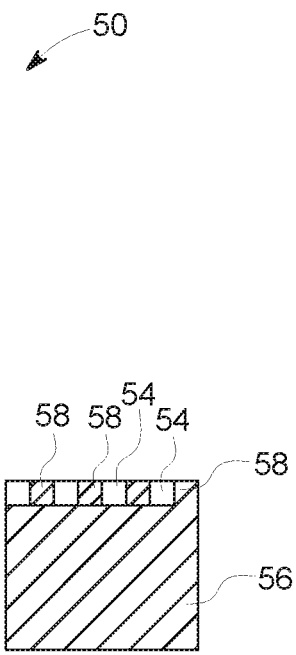
Figure 4D:
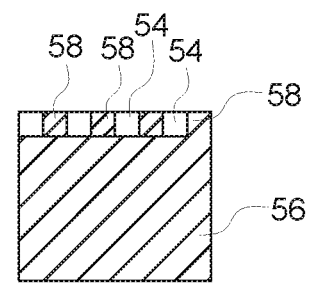
Figure 4E:
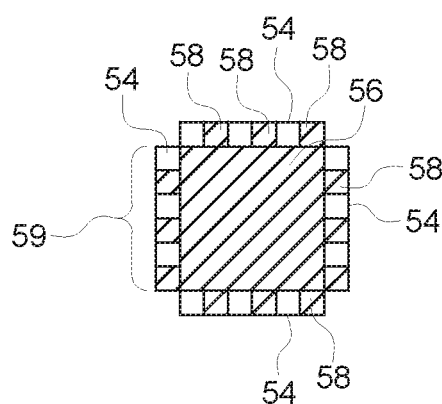

The inventive supercapacitor, as described above, consists of alternating layers of conductive and dielectric materials. Each conductive layer is preferably a highly conductive, highly coherent metallic material that is substantially devoid of microscopic pores. The presence of such microscopic pores in the conductive layer is generally understood to be implicated in current leakage. Examples of suitable metallic materials for the conductive layer include those that are capable of acting as structural materials, such as, for example and without limitation, titanium, molybdenum, aluminum, tantalum, manganese, or niobium. Each dielectric layer is preferably a highly non-conductive material such as diamond-like carbon, graphene, ceramic or insulating polymers.

As depicted in FIGS. 1 and 3, each supercapacitor 12, 14, 16 is composed of alternating layers of conductive material 18 and dielectric material 20. An outer dielectric material will enclose each of supercapacitor 12, 14 and 16 and is not shown for each of reference. While each supercapacitor 12, 14, 16 may be individually fabricated as sheet-like materials, they may also be formed into smaller units or tiles, as depicted in FIG. 1 and each of the individual tiles 12, 14, 16 are formed into an electrically coupled array 10 in which adjacent pairs of individual tiles 12 and 14 and 14 and 16 are electrically connected by an electrical coupler 30.

Since the electrical charge capacity is essentially defined by the two-dimensional aspect of the electrical bi-layer, the electrical storage capacity can be increased progressively by decreasing the thickness of the individual layers to make them sufficient thin while retaining the coherence or non-permeability of the electrical charge. In this manner, the storage capacity of the resulting device is proportional to the number of layers and inversely proportional to the layer thickness, and the arrangement permits high energy storage density.

As illustrated in FIG. 3, the inventive supercapacitor 12, whether in tile, tile array or sheet form, may be joined in some fashion to a structural support body 42 that carries the supercapacitor 12 either on or in the structural support body. Alternatively, the tile array or sheet form of the supercapacitor 12 may itself be formed into the structural body 42. A primary power source 44 for whatever device is carried by the structural body 42 is electrically coupled to the structural body 42 and to the supercapacitor 12. In this arrangement, the primary power source 42 and the supercapacitor 12 operate in a continuous charge-discharge cycle with the supercapacitor 12 functioning to rapidly charge and discharge electrical current, while the primary power source 44 more slowly charges and discharges to and/or from the electrical device carried by the structural body 42.

When formed into an array of a plurality of supercapacitors 12, 14, 16, the electrical connector 30 associated with each individual modular tile to electrically couple each tile with an adjacent tile. Moreover, each conductive layer in each supercapacitor 12, 14, 16 is electrically coupled to each adjacent conductive layer in the same supercapacitor. The individual tiles within array 10 may be coupled in serial or parallel assembly according to the coulombic capacity needed or desired.

FIGS. 4A-4E depict assembly of successive alternating layers of conductive 54 and dielectric 56 layers of the inventive superconductor 50. Each conductive layer 54 may have a conductive projection 54 that projects outwardly from the conductive layer 54 from an edge thereof. Similarly each dielectric layer 56 also may have a dielectric projection 58 that projects outwardly from the dielectric layer 56 from an edge thereof. The conductive projection 54 and the dielectric projection 58 may be a single projection or may be plural projections and may be positioned at any position along an edge or edges of the associated conductive layer 52 or dielectric layer 56. As successive alternating conductive layers 52 and dielectric layers 56 are formed or placed, the conductive projections 54 and the dielectric projections 56 form projection arrays 59 at edges of the assembled supercapacitor 50. These projection arrays 59 may serve as connectors between adjacent supercapacitors when assembled into supercapacitor arrays.

Figure 5:
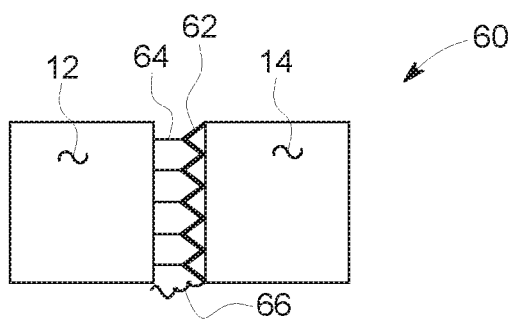
FIG. 5 diagrammatically depicts an embodiment of an electrical connector between adjacent supercapacitors in accordance with the present invention.

FIG. 5 depicts an electromechanical connector 66 between adjacent supercapacitors 12, 4. According to this embodiment of the electromechanical connector 66, supercapacitor 12 has a first connector member 64, that may consist of a projection array 59 or may be another type of detachable electromechanical connector suitable for use with the present invention. Supercapacitor 14 has a second connector member 62 that is configured to detachably and electrically couple to the first connector member 62. In this manner the electromechanical connector 66 joins adjacent pairs of supercapacitors and may be use to form complex supercapacitor arrays with individual supercapacitors being joined in either the X-Y axis relative to each other and along any edge of each supercapacitor and/or in a Z-axis relative to each other with each supercapacitor being layered onto another.

Figure 6:
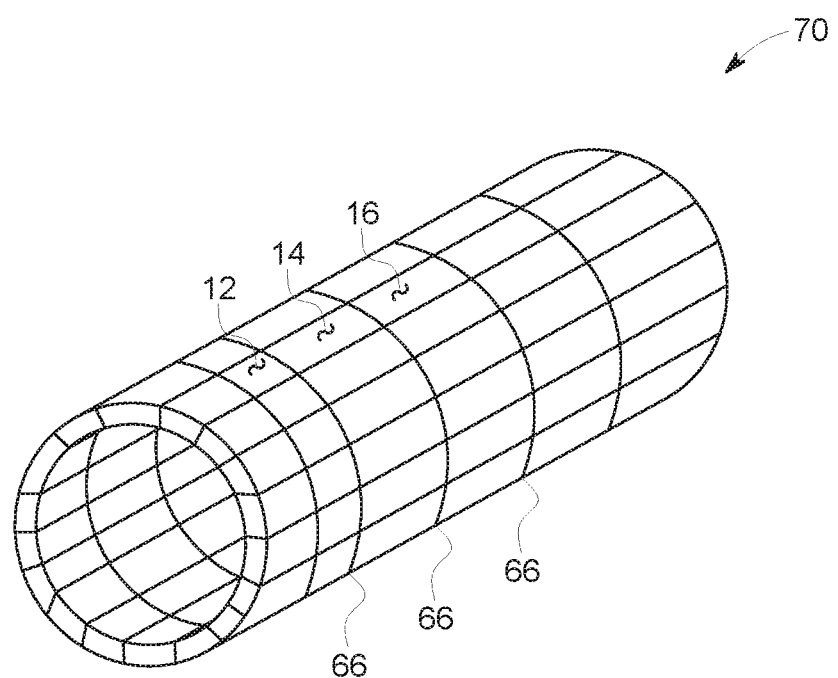
FIG. 6 is a perspective view of an embodiment of the inventive supercapacitor array formed into a generally tubular structure.

FIG. 6 depicts an example of relatively simple tubular supercapacitor array 70, wherein individual supercapacitors 12, 14, 16 are assembled edge to edge by electromechanical connectors 66 and formed into the tubular shape of the supercapacitor array 70. It will be appreciated that the individual supercapacitors 12, 16, 16, as noted above, may be planar, have a curved shape or may have other geometric shape to form a desired three-dimensional geometric shape.

The superconductor sheets or tiles are preferably fabricated by high energy physical vapor deposition onto a flat or shaped substrate. When formed as tiles, each tile may range in size from about 1 mm$^2$ to much larger structures being many square centimeters. Once formed, the tiles are arrayed into larger structures and then joined to a support structure by non-destructive means. These arrays may then be coated or painted as needed for protection.

Alternatively, the individual supercapacitor units 12, 14, 16 may be formed as concentric cylindrical layers with electrical connectors disposed at ends of each of the cylindrical units, similar to conventional cylindrical capacitors. Such concentric cylindrical layers are preferably also formed by physical vapor deposition onto a cylindrical substrate with each successive layer being vapor deposited. A method of physical vapor deposition in a cylindrical magnetron onto a cylindrical substrate is shown in U.S. Patent Application Publication No. US 2014-0042022, which is hereby incorporated by reference. In this case and in the case of planar or substantially planar deposition, the conductive and di-electric layers can be deposited alternatively with breaching vacuum by changing targets or by using load-lock valves as is well known in the physical vapor deposition arts.

U.S. Pat. Nos. 6,379,383, 7,670,690, 9,272,077, and 9,050,394, are incorporated by reference and teach physical vapor deposition processes and methods to control both bulk and surface material properties of a resulting deposited material. Such processes as are described in the incorporated references may be employed to deposit both the conductive layers and the dielectric layers of the inventive supercapacitors and control pore formation and/or pore size within the deposited material to enhance resistance to current leakage, modulate electrical conductivity of the conductive layers and increase the electrical insulating properties of the dielectric layers.

Finally, when forming the supercapacitor array 10, diagnostic circuitry may be included into the array to monitor the functioning of the individual supercapacitor tiles 12, 14, 16. As the array 10 is highly modular, such diagnostic circuitry will facilitate readily identifying faulty tile units and allow for ready replacement of a faulty unit.

What is claimed is:

1. An electrical capacitor assembly, comprising:
   a. A first plurality of interlaced conductive and dielectric layers configured to form a first modular element;
   b. A second plurality of interlaced conductive and dielectric layers configured to form a second modular element; and
   c. Wherein the first modular element and the second modular element are electrically and structurally connected to each other and form a structural member of a larger shape memory structural element.

2. The electrical capacitor assembly of claim 1 wherein the first modular element or the second modular are non-rolled and curved or non-planar structural shapes.

3. The electrical capacitor assembly of claim 1 wherein the first module and the second module are coupled to each other and to a power supply, electric circuit, diagnostic circuitry, or at least second electrical capacitor assembly.

4. The electrical capacitor assembly of claim 3 wherein the first module and the second module are coupled to each other in series or in parallel.

5. The electrical capacitor assembly of claim 1 wherein the each interlaced conductive layer of the first plurality of interlaced layers and each interlaced conductive layer of the second plurality of interlaced layers further comprise conductive connectors configured to couple each module to each other or to a power supply, electric circuit, or diagnostic circuitry.

6. The electrical capacitor assembly of claim 1 wherein the modular element and the second modular are connected in in an X-Y plane, an X-Z plane, a Y-Z plane, or any combination thereof.

7. An electrical capacitor assembly, comprising a three-dimensional shape memory structural member at least partially formed of a plurality of modular electrical capacitors, each of the plurality of modular electrical capacitors comprising at least one conductive layer of a shape memory metal having at least one conductive projection extending there from; wherein a first modular electrical capacitor of the plurality of modular electrical capacitors is electrically coupled to a second modular electrical capacitor of the plurality of modular electrical capacitors by coupling the at least one conductive projection of a first modular electrical capacitor with the at least one conductive layer of the second modular electrical capacitor.

8. The electrical capacitor assembly of claim 7, wherein each modular electrical capacitor of the plurality of modular electrical capacitors further comprises a plurality of alternating dielectric layers and vacuum deposited conductive layers, each vacuum deposited conductive layer having at least one conductive projection extending therefrom.

9. The electrical capacitor assembly of claim 8, wherein the plurality of modular electrical capacitors further is configured as an array of electrically coupled modular electrical capacitors positioned in the X-axis and/or Y-axis of individual modular electrical capacitors.

10. The electrical capacitor assembly of claim 9, wherein the array of electrically coupled modular electrical capacitors is coupled to a cylindrical substrate.

11. The electrical capacitor assembly of claim 7, wherein the at least one electrical capacitor has a thickness between about 1 micron to about 10 millimeters.

12. The electrical capacitor assembly of claim 11, wherein the at least one electrical capacitor has greater than about 100 layers of conductive and dielectric layers.

13. The electrical capacitor assembly of claim 12, wherein each of the conductive and dielectric layers has a thickness between about 10 nm to about 1 micron.

14. The electrical capacitor assembly of claim 7, wherein the at least one modular electrical capacitor is coupled to at least a second modular electrical capacitor by coupling the at least one modular electrical capacitor assembly conductive projections to a detachable connector member and coupling the at least second modular electrical capacitor to the detachable connector member, the detachable connector member electrically coupling the at least one electrical capacitor and the at least second electrical capacitor.

* * * * *